US010492229B2

(12) United States Patent
Fujishiro et al.

(10) Patent No.: US 10,492,229 B2
(45) Date of Patent: *Nov. 26, 2019

(54) COMMUNICATION CONTROL METHOD, USER TERMINAL, AND PROCESSOR

(71) Applicant: KYOCERA CORPORATION, Kyoto (JP)

(72) Inventors: Masato Fujishiro, Yokohama (JP); Chiharu Yamazaki, Ota-ku (JP); Kugo Morita, Yokohama (JP); Yushi Nagasaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,879

(22) Filed: Jun. 25, 2018

(65) Prior Publication Data
US 2018/0310343 A1 Oct. 25, 2018

Related U.S. Application Data

(63) Continuation of application No. 14/900,761, filed as application No. PCT/JP2014/065788 on Jun. 13, 2014, now Pat. No. 10,009,927.

(30) Foreign Application Priority Data

Jun. 25, 2013 (JP) ................. 2013-132468

(51) Int. Cl.
H04W 74/08 (2009.01)
H04W 74/00 (2009.01)
(Continued)

(52) U.S. Cl.
CPC ..... H04W 74/0833 (2013.01); H04W 74/004 (2013.01); H04W 74/006 (2013.01);
(Continued)

(58) Field of Classification Search
CPC ........... H04W 74/0833; H04W 74/004; H04W 74/006; H04W 74/008; H04W 76/27; H04W 76/10; H04W 4/70; H04W 84/12
See application file for complete search history.

(56) References Cited

U.S. PATENT DOCUMENTS 8,902,763 B2 12/2014 DiGirolamo et al.
9,247,471 B2 1/2016 Velev et al.
(Continued)

FOREIGN PATENT DOCUMENTS

GB 2489690 A 10/2012
JP 2011-511509 A 4/2011
(Continued)

OTHER PUBLICATIONS

International Search Report and Written Opinion; issued in PCT/JP2014/065788; dated Sep. 2, 2014.
(Continued)

Primary Examiner — Khaled M Kassim
Assistant Examiner — Thomas R Cairns
(74) Attorney, Agent, or Firm — Studebaker & Brackett PC

(57) ABSTRACT

A base station transmits, to a user terminal, a connection release request for requesting a release of an RRC connection. The connection release request includes information indicating a request of holding an identifier assigned by the base station, and the information causes the user terminal in an idle state to hold the identifier. The base station performs a random access procedure with the user terminal in the idle state. The random access procedure includes receiving a random access signal from the user terminal, transmitting a random access response that is a response to the random access signal, to the user terminal, and receiving a control signal together with the identifier from the user terminal (Continued)

after transmitting the random access response, while the user terminal is in the idle state.

2 Claims, 7 Drawing Sheets

(51) Int. Cl.
  *H04W 76/27* (2018.01)
  *H04W 76/10* (2018.01)
  *H04W 84/12* (2009.01)
  *H04W 4/70* (2018.01)

(52) U.S. Cl.
  CPC ......... *H04W 74/008* (2013.01); *H04W 76/10* (2018.02); *H04W 76/27* (2018.02); *H04W 4/70* (2018.02); *H04W 84/12* (2013.01)

(56) References Cited

U.S. PATENT DOCUMENTS

| | | |
|---|---|---|
| 2009/0196261 A1 | 8/2009 | Sambhwani et al. |
| 2012/0163311 A1 | 6/2012 | Park |
| 2013/0301611 A1 | 11/2013 | Baghel et al. |
| 2014/0133424 A1 | 5/2014 | Yoshizawa |
| 2014/0161103 A1 | 6/2014 | Sirotkin et al. |

FOREIGN PATENT DOCUMENTS

| | | |
|---|---|---|
| JP | 2013-055460 A | 3/2013 |
| WO | 2013/027018 A1 | 2/2013 |

OTHER PUBLICATIONS

3GPP TS 36300 V115.0 (Mar. 2013), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP Organizational Partners, 2013.

Extended European Search Report (EESR) dated Jan. 18, 2017 from corresponding EP Appl No. 14818444.3, 7 pp.

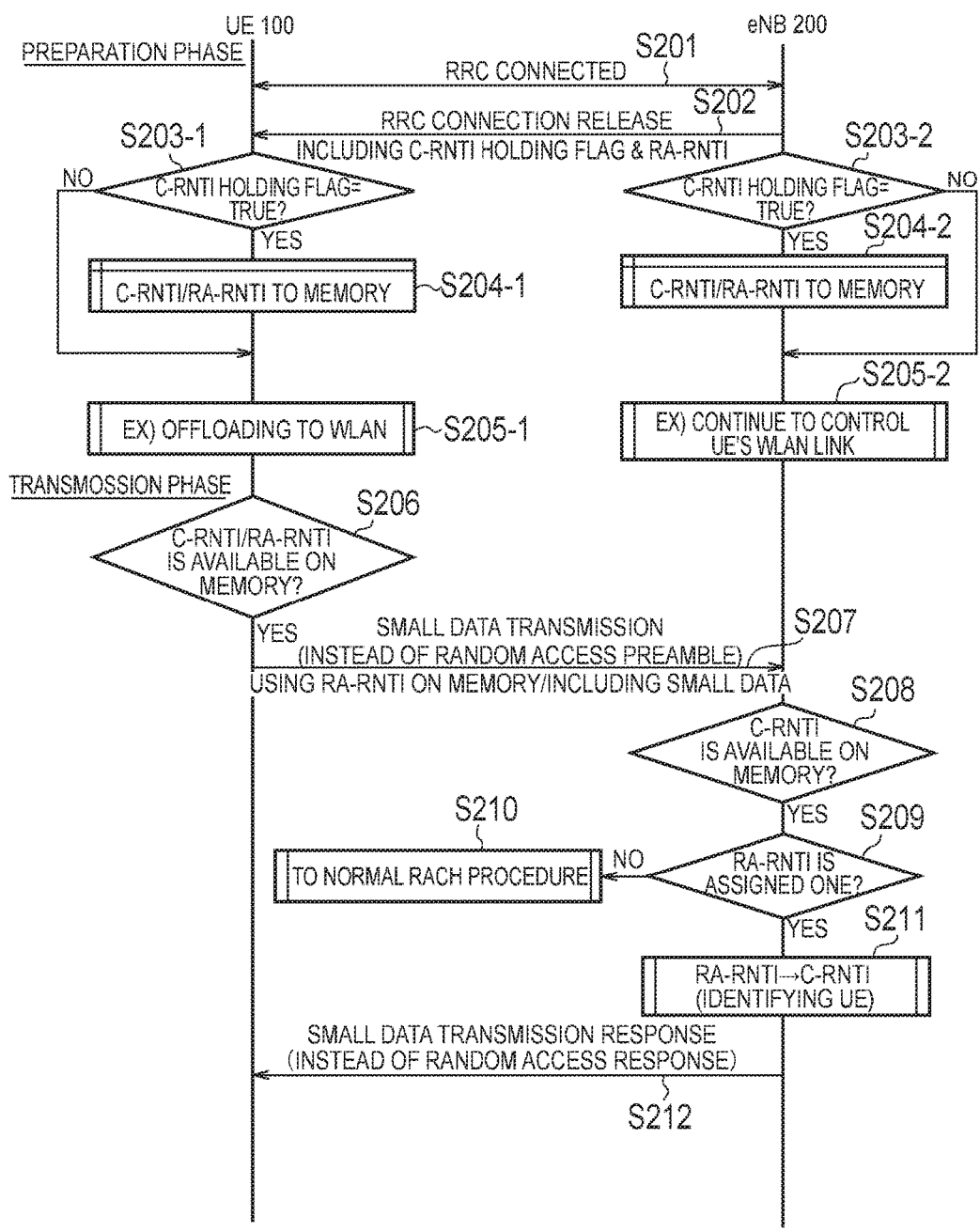

COMMUNICATION CONTROL METHOD, USER TERMINAL, AND PROCESSOR

CROSS REFERENCE TO RELATED APPLICATIONS

This application is a Continuation Application of U.S. patent application Ser. No. 14/900,761 filed Dec. 22, 2015, which is the U.S. National Phase Application of International Patent Application No. PCT/JP2014/065788 filed Jun. 13, 2014, which claims benefit of Japanese Patent Application No. 2013-132468 filed Jun. 25, 2013, the entire contents of which are incorporated herein by reference.

TECHNICAL FIELD

The present invention relates to a communication control method, a user terminal, and a processor, used in a cellular communication system.

BACKGROUND ART

A user terminal used in a cellular communication system operates in either one of the states, a connected state or an idle state. The user terminal transmits and receives data (user data and a control signal) with a cell in the connected state. On the other hand, in the idle state, in order to prevent battery consumption, the user terminal regularly monitors a paging channel without exchanging the data.

Further, in order to transition to the connected state, the user terminal in the idle state needs to perform a random access procedure for a cell (see Non-Patent Literature 1, for example). The user terminal establishes synchronization with a cell by the random access procedure, and is assigned a terminal identifier that is an identifier of the user terminal in the cell. The user terminal transitioned to the connected state by the random access procedure becomes capable of exchanging the data with the cell.

CITATION LIST

Non Patent Literature

[NPL 1] 3GPP Technical Report "TS 36.300 V11.5.0" March, 2013

SUMMARY OF INVENTION

Even when transmitting a small amount of data such as a control signal to a cell, a user terminal in an idle state needs to transition to a connected state by a random access procedure to transmit the small amount of data to the cell.

However, there is a problem that when the user terminal transitions to the connected state just to transmit the small amount of data to the cell, it is not efficient in view of a load of a network and battery consumption of the user terminal.

Therefore, an object of the present invention is to enable efficient transmission of a small amount of data to a cell from a user terminal in an idle state.

A communication control method according to the present discloses is performed at a base station and includes a step of transmitting, to a user terminal, a connection release request for requesting a release of an RRC connection. The connection release request includes information indicating a request of holding an identifier assigned by the base station, and the information causes the user terminal in an idle state to hold the identifier. The method includes a step of performing a random access procedure with the user terminal in the idle state. The step of performing the random access procedure includes the steps of receiving a random access signal from the user terminal, transmitting a random access response that is a response to the random access signal, to the user terminal, and receiving a control signal together with the identifier from the user terminal after transmitting the random access response, while the user terminal is in the idle state.

A base station according to the present disclosure comprises a controller configured to transmit, to a user terminal, a connection release request for requesting a release of an RRC connection. The connection release request includes information indicating a request of holding an identifier assigned by the base station, and the information causes the user terminal in an idle state to hold the identifier. The controller configured to perform a random access procedure with the user terminal in the idle state. In the random access procedure, the controller is configured to receive a random access signal from the user terminal, transmit a random access response that is a response to the random access signal, to the user terminal, and receive a control signal together with the identifier from the user terminal after transmitting the random access response, while the user terminal is in the idle state.

BRIEF DESCRIPTION OF DRAWINGS

FIG. 9 is an operation sequence chart according to the second embodiment.

DESCRIPTION OF EMBODIMENTS

Overview of Embodiments

Figure 1:
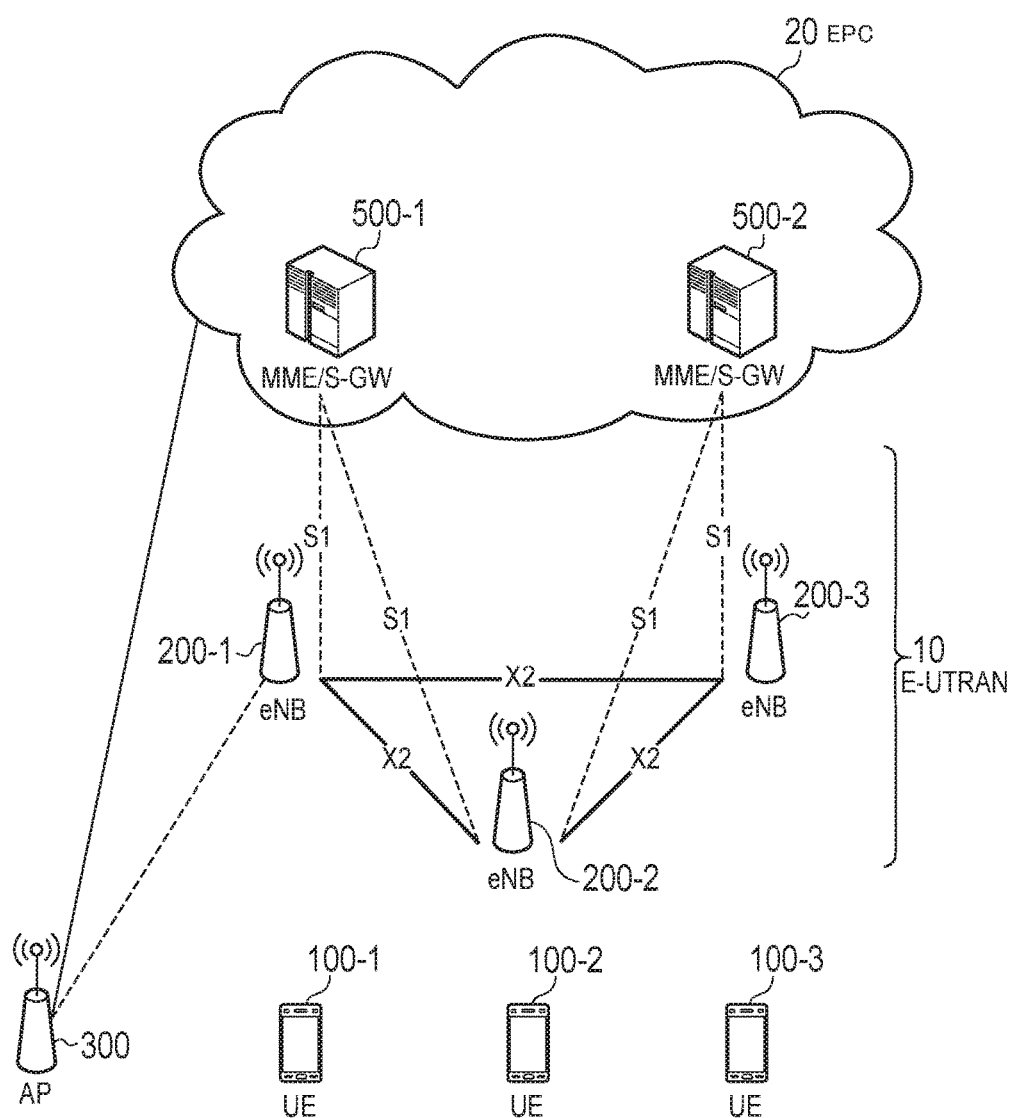
FIG. 1 is a system configuration diagram according to a first embodiment and a second embodiment.

A communication control method according to a first embodiment and a second embodiment is used in a cellular communication system including a user terminal operating in either one of states, a connected state or an idle state. The communication control method comprises a step of performing, by the user terminal, a random access procedure for a cell, in the idle state. The step of performing the random access procedure includes the steps of: transmitting, by the user terminal, a small amount of data to the cell; and ending, by the user terminal, the random access procedure without transitioning to the connected state, after transmitting the small amount of data.

In the first embodiment and the second embodiment, the communication control method further comprises a step of holding, by the user terminal and the cell, a terminal identifier assigned to the user terminal, prior to the step of performing the random access procedure. The terminal identifier held by the user terminal and the cell is utilized for identifying the user terminal in the step of performing the random access procedure.

In the first embodiment, the step of performing the random access procedure further comprises the steps of transmitting, by the user terminal, a random access signal including information indicating that the small amount of data is transmitted, to the cell; and receiving, by the user terminal, a random access response that is a response to the random access signal, from the cell. The step of transmitting the small amount of data includes a step of transmitting, by the user terminal, the terminal identifier together with the small amount of data to the cell, in response to reception of the random access response.

In the second embodiment, the communication control method further comprises the steps of: prior to the step of performing the random access procedure, receiving, by the user terminal, a parameter identifier indicating a parameter that should be applied to a random access signal to be transmitted to the cell, from the cell; and holding, by the user terminal and the cell, the parameter identifier. The step of performing the random access procedure includes a step of transmitting, by the user terminal, the random access signal to which the parameter indicated by the parameter identifier is applied and which includes the small amount of data, to the cell.

In the first embodiment and the second embodiment, the communication control method further comprises a step of transitioning, by the user terminal supporting wireless LAN communication, to the idle state in addition to establishing a connection with a wireless LAN access point, prior to the step of performing the random access procedure. The step of performing the random access procedure further comprises a step of transmitting, by the user terminal, the small amount of data to the cell while maintaining the connection with the wireless LAN access point.

In the first embodiment and the second embodiment, the small amount of data is a control signal indicating a communication state of the wireless LAN communication.

A user terminal according to the first embodiment and the second embodiment, operates in either one of states, a connected state or an idle state. The user terminal comprises a controller configured to perform a random access procedure for a cell, in the idle state. The controller transmits a small amount of data to the cell when performing the random access procedure. The controller ends the random access procedure without transitioning to the connected state, after transmitting the small amount of data.

A processor according to the first embodiment and the second embodiment is provided in a user terminal operating in either one of states, a connected state or an idle state. The processor performs a random access procedure for a cell, in the idle state. The processor transmits a small amount of data to the cell when performing the random access procedure. The processor ends the random access procedure without transitioning to the connected state, after transmitting the small amount of data.

First Embodiment

Below, with reference to the drawing, an embodiment will be described in which a cellular communication system (LTE system) configured to comply with the 3GPP standards is cooperated with a wireless LAN (WLAN) system.

(System Configuration)

FIG. 1 is a system configuration diagram according to the first embodiment. As shown in FIG. 1, a cellular communication system includes a plurality of UEs (User Equipments) 100, an E-UTRAN (Evolved-UMTS Terrestrial Radio Access Network) 10, and an EPC (Evolved Packet Core) 20. The E-UTRAN 10 corresponds to a radio access network. The EPC 20 corresponds to a core network.

The UE 100 is a mobile-type radio communication device and performs radio communication with a cell with which a connection is established. The UE 100 corresponds to a user terminal. The UE 100 is a terminal (dual terminal) that supports both communication schemes of cellular communication and WLAN communication.

The E-UTRAN 10 includes a plurality of eNBs 200 (evolved Node-Bs). The eNB 200 corresponds to a cellular base station. The eNB 200 manages one or a plurality of cells, and performs radio communication with the UE 100 with which a connection is established with a cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling, for example.

The eNBs 200 are connected mutually via an X2 interface. Further, the eNB 200 is connected via an S1 interface to an MME/S-GW 500 included in the EPC 20.

The EPC 20 includes a plurality of MMEs (Mobility Management Entities)/S-GWs (Serving-Gateways) 500. The MME is a network node that performs various mobility controls, etc., on the UE 100, and corresponds to a control station. The S-GW is a network node that performs control to transfer user data and corresponds to a mobile switching center.

The WLAN system includes a WLAN access point (hereinafter, "AP") 300. The WLAN system is configured to comply with various IEEE 802.11 specifications, for example. The AP 300 communicates with the UE 100 in a frequency band (WLAN frequency band) different from a cellular frequency band. The AP 300 is connected, via a router, etc., to the EPC 20.

Further, in addition to a case where the eNB 200 and the AP 300 are individually located, the eNB 200 and the AP 300 may also be "Collocated". As one mode of the "Collocated", the eNB 200 and the AP 300 may be directly connected to each other through any interface of an operator.

Next, configurations of the UE 100, the eNB 200, and the AP 300 will be described.

Figure 2:
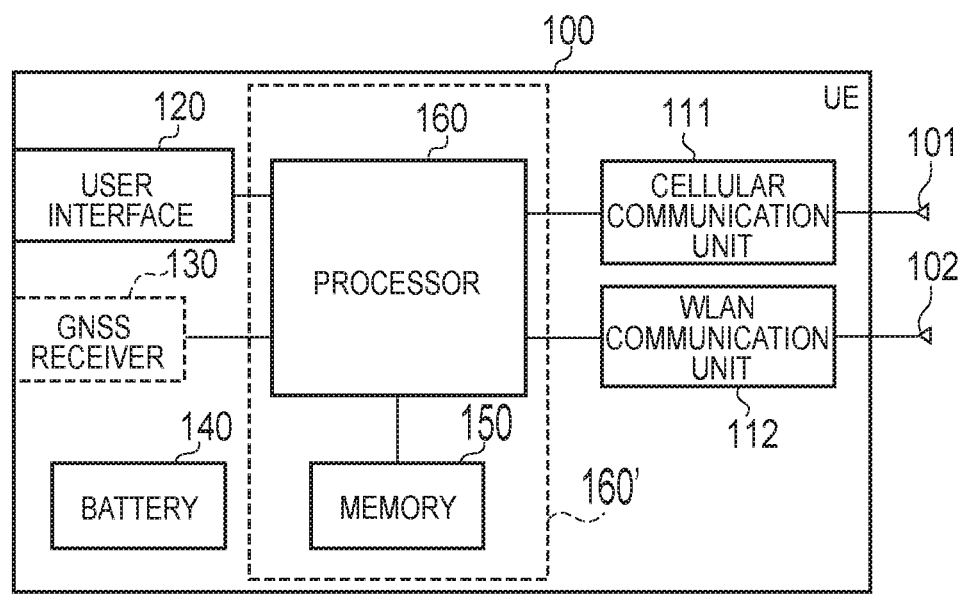
FIG. 2 is a block diagram of UE (user terminal) according to the first embodiment and the second embodiment.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiving equipment 130; a battery 140; a memory 150; and a processor 160. The memory 150 and the processor 160 configure a controller. The UE 100 may not necessarily have the GNSS receiving equipment 130. Furthermore, the memory 150 may be integrally formed with the processor 160, and this set (that is, a chip set) may be called a processor 160'.

The antenna 101 and the cellular communication unit 111 are used for exchanging a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving the WLAN radio signal. The WLAN communication unit 112 converts the baseband signal output from the processor 160 into the WLAN radio signal and transmits the same from the antenna 102. Further, the WLAN communication unit 112 converts the WLAN radio signal received by the antenna 102 into the baseband signal and outputs the same to the processor 160.

The user interface 120 is an interface with a user carrying the UE 100, and includes, for example, a display, a microphone, a speaker, various buttons and the like. Upon receipt of the input from a user, the user interface 120 outputs a signal indicating a content of the input to the processor 160. The GNSS receiving equipment 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal and a CPU that performs various processes by executing the program stored in the memory 150. The processor 160 may further include a codec that performs encoding and decoding on sound and video signals. The processor 160 executes various types of processes and various types of communication protocols described later.

Figure 3:
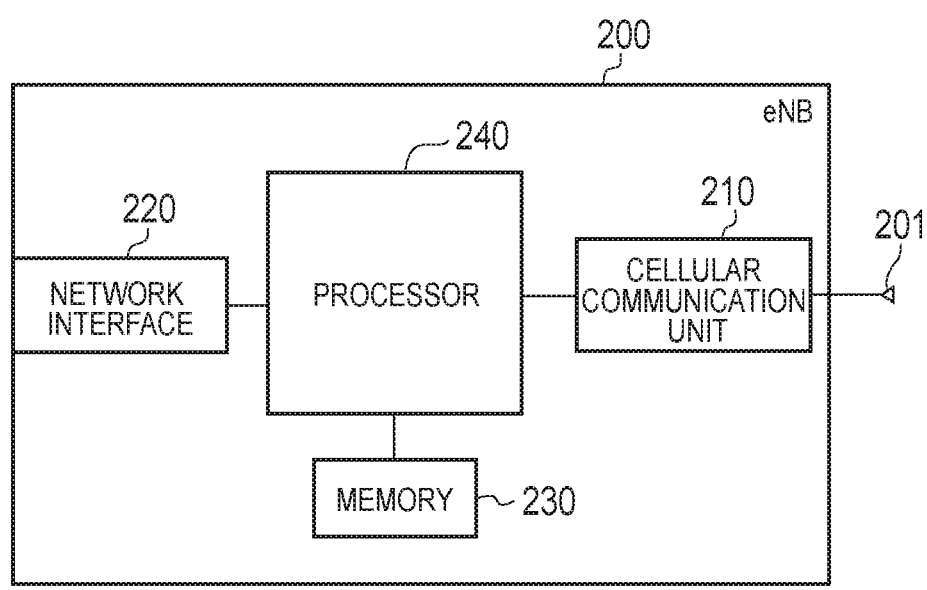
FIG. 3 is a block diagram of eNB (base station) according to the first embodiment and the second embodiment.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 configure a controller.

The antenna 201 and the cellular communication unit 210 are used for exchanging a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to a neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
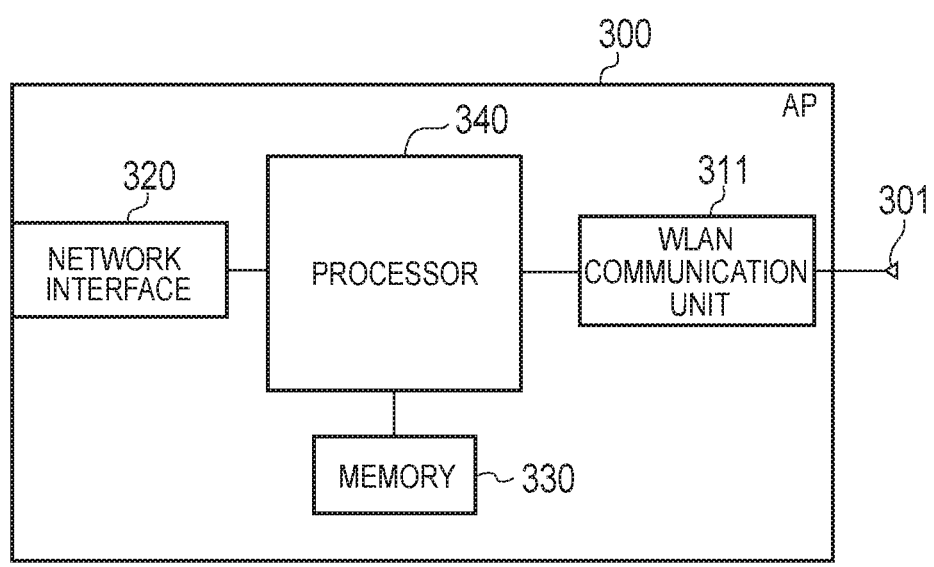
FIG. 4 is a block diagram of AP (access point) according to the first embodiment and the second embodiment.

FIG. 4 is a block diagram of the AP 300. As shown in FIG. 4, the AP 300 includes an antenna 301, a WLAN communication unit 311, a network interface 320, a memory 330, and a processor 340.

The antenna 301 and the WLAN communication unit 311 are used for transmitting and receiving the WLAN radio signal. The WLAN communication unit 311 converts the baseband signal output from the processor 340 into the WLAN radio signal and transmits the same from the antenna 301. Further, the WLAN communication unit 311 converts the WLAN radio signal received by the antenna 301 into the baseband signal and outputs the same to the processor 340.

The network interface 320 is connected to the EPC 20 via a router, etc. Further, the network interface 320 is used for communication with the eNB 200 via the EPC 20.

The memory 330 stores a program to be executed by the processor 340 and information to be used for a process by the processor 340. The processor 340 includes a baseband processor that performs modulation and demodulation, encoding and decoding and the like on the baseband signal and a CPU that performs various processes by executing the program stored in the memory 330.

Figure 5:
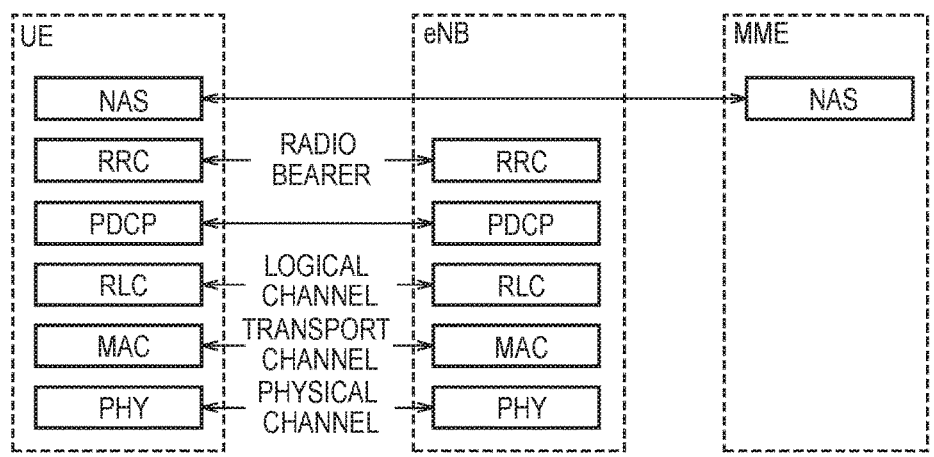
FIG. 5 is a protocol stack diagram of a radio interface according to the first embodiment and the second embodiment.

FIG. 5 is a protocol stack diagram of a radio interface in the LTE system. As shown in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signal are transmitted via the physical channel.

The MAC layer performs priority control of data, a retransmission process by hybrid ARQ (HARQ), random access procedure and the like. Between the MAC layer of the UE 100 and the MAC layer of the eNB 200, user data and control signal are transmitted via a transport channel. The MAC layer of the eNB 200 includes a scheduler that determines a transport format (a transport block size, a modulation and coding scheme and the like) of an uplink and a downlink, and a resource block to be assigned to the UE 100. More information of the random access procedure will be described later.

The RLC layer uses the functions of the MAC layer and the physical layer to transmit data to an RLC layer at a reception side. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane handling control signal. Between the RRC layer of the UE 100 and the RRC layer of the eNB 200, a control signal (an RRC message) for various types of configurations is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state, otherwise, the UE 100 is in an idle state.

A NAS (Non-Access Stratum) layer positioned above the RRC layer performs a session management, a mobility management and the like.

Figure 6:
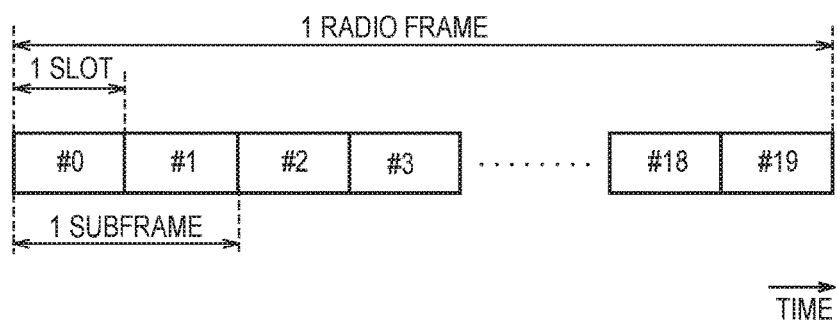
FIG. 6 is a configuration diagram of a radio frame according to the first embodiment and the second embodiment.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As shown in FIG. 6, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Among radio resources assigned to the UE 100, a frequency resource can be specified by a resource block and a time resource can be specified by a subframe (or slot).

In the downlink, an interval of several symbols at the head of each subframe is a region used as a physical downlink control channel (PDCCH) for mainly transmitting the control signal. Furthermore, the remaining interval of each subframe is a region available as a physical downlink shared channel (PDSCH) for mainly transmitting user data.

In the uplink, both ends in the frequency direction of each subframe are regions used as a physical uplink control channel (PUCCH) for mainly transmitting the control signal. Further, the central six resource blocks in the frequency direction of each subframe are regions available as a physical random access channel (PRACH) for transmitting the random access signal. The other portion of each subframe is a region available as a physical uplink shared channel (PUSCH) for mainly transmitting user data.

(Random Access Procedure)

In order to transition to the connected state, the UE 100 in the idle state needs to perform a random access procedure for a cell. A general random access procedure in the LTE system will be described, below.

Prior to a random access, the UE 100 uses a cell search to establish downlink synchronization with a cell of the eNB 200. One purpose of the random access is to establish uplink synchronization with the cell.

As a first process of the random access procedure, the UE 100 transmits over the PRACH a random access signal to the eNB 200. The random access signal is a signal for performing a random access to the eNB 200 from the UE 100 in the MAC layer. The random access signal is called a random access preamble because of its specifications.

As a resource used for transmitting the random access signal (hereinafter, "random access resource"), there are a signal sequence of the random access signal and transmission timing of the random access signal, for example.

When the UE 100 in the idle state performs the random access, the UE 100 selects the random access resource on the basis of broadcast information received from the eNB 200. The broadcast information includes a master information block (MIB) and a system information block (SIB). The UE 100 uses the selected random access resource to transmit the random access signal to the eNB 200. Such a random access is called a "contention base".

As a second process of the random access procedure, the eNB 200 estimates uplink delay between the eNB 200 and the UE 100, on the basis of the random access signal received from the UE 100. Further, the eNB 200 determines a radio resource to be assigned to the UE 100. Then, the eNB 200 transmits a random access response to the UE 100. The random access response includes a timing correction value based on a result of a delay estimation, information on the determined assigned radio resource, information indicating a signal sequence of a random access signal received from the UE 100, and a temporary terminal identifier (TC-RNTI: Temporary Cell-Radio Network Temporary Identifier) to be assigned to the UE 100, for example.

When receiving the random access response including information corresponding to the random access signal within a predetermined time period since transmitting the random access signal, the UE 100 determines that the random access is successful. Otherwise, the UE 100 determines that a random access failure occurs, and performs the first process again. During a second transmission of the random access signal, the UE 100 sets transmission power higher than that during a first transmission of the random access signal in order to enhance a success rate of the random access.

As a third process of the random access procedure, the UE 100 that determines that the random access is successful transmits, in the RRC layer, to the eNB 200 an RRC connection message for requesting establishment of the RRC connection, on the basis of the information included in the random access response. The RRC connection message includes an identifier of the UE 100 from which this message is originated.

As a fourth process of the random access procedure, the eNB 200 transmits to the UE 100 a response message in response to the RRC connection message. The response message includes an identifier of the UE 100 to which the message is transmitted. When a contention occurs as a result of the same random access resource being used, a plurality of UEs 100 may respond to the same random access response; however, such a contention is resolved by the fourth process. The UE 100 to which a terminal identifier (CRNTI: Cell-Radio Network Temporary Identifier) in the cell is not assigned by this time point, continuously uses the TC-RNTI as the C-RNTI.

Operation According to First Embodiment

Next, an operation according to the first embodiment will be described.

(1) Operation Environment

Figure 7:
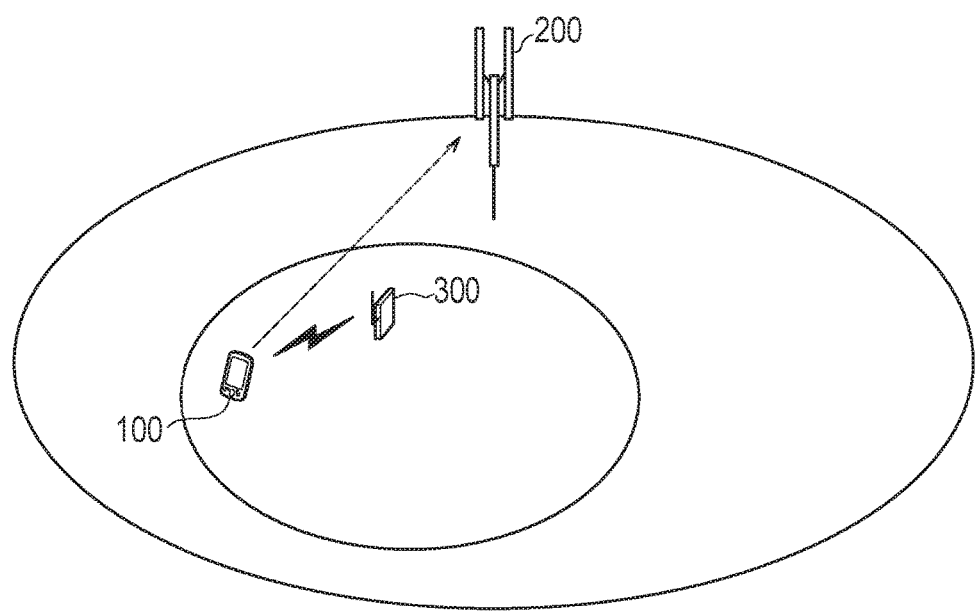
FIG. 7 is a diagram for describing an operation environment according to the first embodiment to the second embodiment.

FIG. 7 is a diagram for describing an operation environment according to the first embodiment. As shown in FIG. 7, the AP 300 is provided in a coverage area of the eNB 200. The AP 300 is an AP (Operator controlled AP) managed by an operator of a cellular communication system, for example. Further, the UE 100 is located in the coverage area of the eNB 200 and in a coverage area of the AP 300.

Firstly, the UE 100 establishes an RRC connection with the eNB 200 to perform cellular communication with the eNB 200. Specifically, the UE 100 exchanges a cellular radio signal including a traffic (user data) with the eNB 200. When the eNB 200 establishes an RRC connection with a large number of UEs 100, a load level of the eNB 200 increases. The load level means the degree of congestion in the eNB 200 such as a traffic load of the eNB 200 or usage of radio resources of the eNB 200.

Secondly, the UE 100 establishes a connection with the AP 300 on the basis of a determination by the UE 100 itself or in accordance with an instruction from the eNB 200 to release the RRC connection with the eNB 200. Thus, when the exchange of traffic between the eNB 200 and the UE 100 is switched to the exchange of traffic between the AP 300 and the UE 100, it becomes possible to transfer (offload) the traffic load in the eNB 200 to the AP 300. While such an offload is executed, the UE 100 is in the idle state of the cellular communication.

It is preferable that while the offload is executed, by receiving a report on a situation (a communication state of WLAN communication, etc.) of the UE 100 from the UE 100, the eNB 200 is capable of grasping the situation of the UE 100. However, the UE 100 that establishes a connection with the AP 300 is in the idle state, and thus, the UE 100 needs to transition to the connected state by the random access procedure to exchange the data with the cell of the eNB 200.

However, when the UE 100 transitions to the connected state just to transmit such a small amount of data to the cell, it is not efficient in view of a load of a network and battery consumption of the UE 100. A method of enabling efficient transmission of a small amount of data to a cell from the UE 100 in the idle state will be described, below.

(2) Communication Control Method According to First Embodiment

A communication control method according to the first embodiment is used in a cellular communication system including the UE 100 that operates in either one of the states, a connected state or an idle state. The communication control method according to the first embodiment includes a step of performing, by the UE 100, the random access procedure for the cell, in the idle state. The step of performing the random access procedure includes steps of: transmitting, by the UE 100, a small amount of data to the cell; and ending, by the UE 100, the random access procedure without transitioning to the connected state, after transmitting the small amount of data. The small amount of data is data singly transmitted by the UE 100, for example. The small amount of data may be a control signal and may be user data. In the first embodiment, description mainly proceeds with a case where the small amount of data is the control signals.

Thus, in the first embodiment, the UE 100 in the idle state transmits a small amount of data to the cell in the process of the random access procedure and ends the random access procedure without transitioning to the connected state, and therefore, the UE 100 is capable of transmitting the small amount of data while maintaining the idle state.

The communication control method according to the first embodiment further includes a step of holding, by the UE 100 and the cell, the C-RNTI assigned to the UE 100, prior to the step of performing the random access procedure. The C-RNTI held by the UE 100 and the cell is utilized for identifying the UE 100 in the step of performing the random access procedure.

As a result, it is possible to utilize the C-RNTI in the UE 100 in the idle state. Further, the cell (eNB 200) is capable of grasping the UE 100 that performs the random access procedure in order to transmit the small amount of data.

In the first embodiment, the step of performing the random access procedure further includes steps of: transmitting, by the UE 100, the random access signal including information indicating that the small amount of data is transmitted to the cell; and receiving, by the UE 100, the random access response that is a response to the random access signal, from the cell. The step of transmitting the small amount of data includes a step of transmitting, by the UE 100, the C-RNTI together with the small amount of data to the cell, in response to the reception of the random access response.

As a result, the eNB 200 is capable of grasping on the basis of the random access signal that the random access procedure for transmitting the small amount of data is started, and capable of performing a handling different from a normal random access procedure. Further, the eNB 200 receives, together with the small amount of data, the CRNTI to thereby recognize the UE 100 from which the small amount of data is originated.

The communication control method according to the first embodiment further includes a step of transitioning, by the UE 100 configured to support the WLAN communication, to the idle state in addition to establishing a connection with the AP 300, prior to the step of performing the random access procedure. The step of performing the random access procedure further includes a step of transmitting, by the UE 100, the small amount of data to the cell while maintaining the connection with the AP 300.

As a result, the cell (eNB 200) is capable of grasping a situation of the UE 100 by receiving the small amount of data from the UE 100 in the middle of the offload.

In the first embodiment, the small amount of data is a control signal indicating a communication state of the WLAN communication. Examples of the communication state of the WLAN communication include reception strength of a signal (RSSI: Received Signal Strength Indicator) received by the UE 100 from the AP 300, or a load level of the AP 300.

As a result, the cell (eNB 200) is capable of grasping a communication state of the WLAN communication in the UE 100 in the middle of the offload.

(3) Operation Sequence According to First Embodiment

Figure 8:
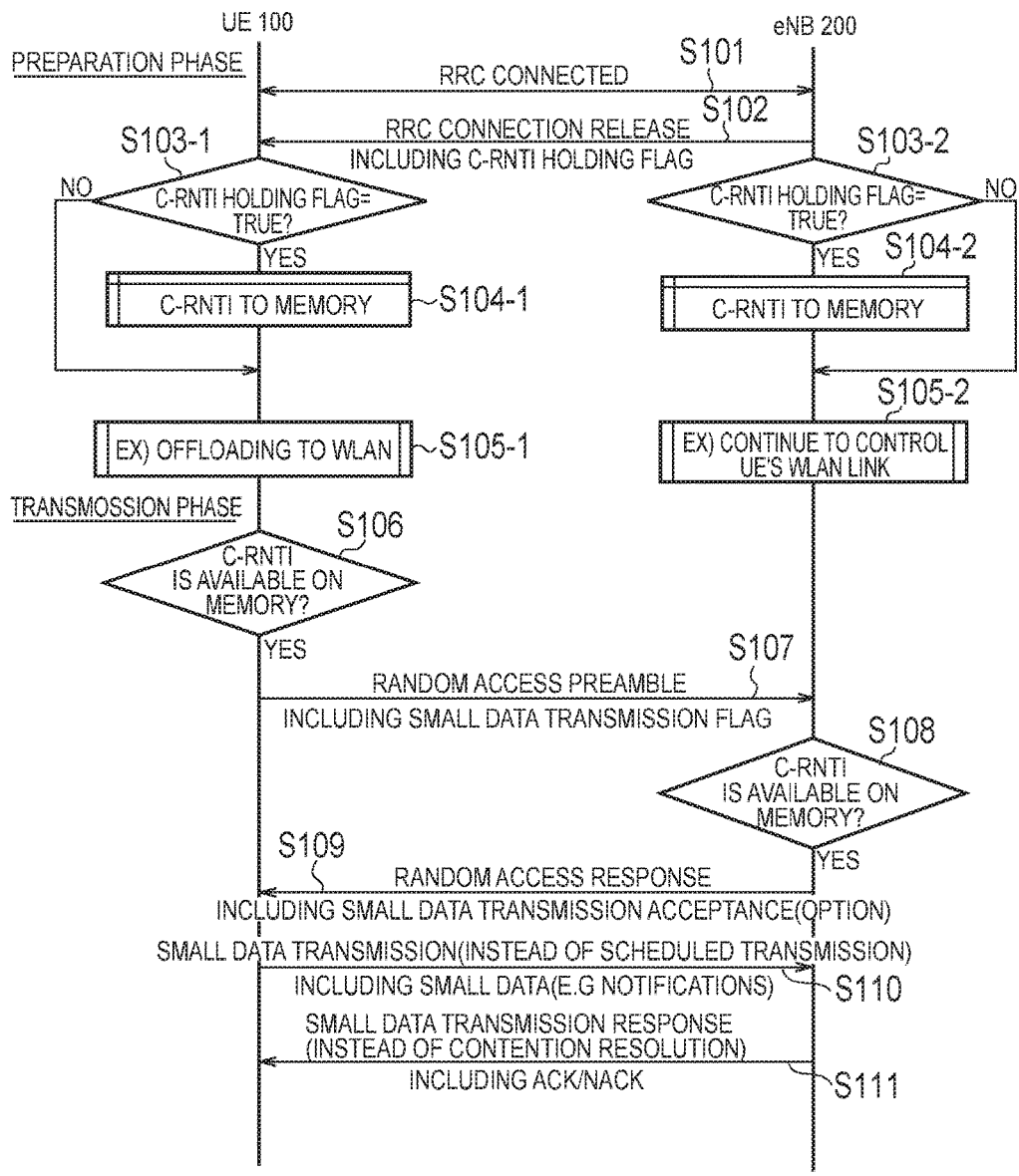
FIG. 8 is an operation sequence chart according to the first embodiment.

FIG. 8 is an operation sequence chart according to the first embodiment.

As shown in FIG. 8, in step S101, the UE 100 is in a state of establishing an RRC connection with the eNB 200 (connected state).

In step S102, the eNB 200 transmits a connection release request for requesting a release of the RRC connection, to the UE 100. In the first embodiment, the connection release request includes a C-RNTI holding flag that is information indicating whether or not to request holding of the C-RNTI. The UE 100 receives the connection release request including the C-RNTI holding flag.

In step S103-1, the UE 100 confirms whether or not the C-RNTI holding flag included in the connection release request is "true" indicating that the holding of the C-RNTI is requested. When the C-RNTI holding flag is "true" (step S103-1: YES), in step S104-1, the UE 100 holds the C-RNTI assigned from the eNB 200.

In step S103-2, the eNB 200 confirms whether or not the C-RNTI holding flag included in the connection release request is "true" indicating that the holding of the C-RNTI is requested. When the C-RNTI holding flag is "true" (step S103-2: YES), in step S104-2, the eNB 200 holds the C-RNTI assigned to the UE 100.

In step S105-1, the UE 100 transitioned to the idle state in response to the connection release request exchanges the traffic with the AP 300. This reduces (that is, offloads) the traffic load of the eNB 200.

In step S105-2, the eNB 200 continues to monitor the situation of the UE 100 in preparation for a situation where the UE 100 is connected again with the cell of the eNB 200.

In step S106, the UE 100 confirms whether or not the C-RNTI is held. When the C-RNTI is held and when there arises a need of transmitting the small amount of data to the eNB 200, the UE 100 determines to start the random access procedure for transmitting the small amount of data. Examples of when there arises a need of transmitting the small amount of data include when a predetermined event (worsening of a communication state with the AP 300, for example) occurs or when a periodical timer expires.

From steps S107 to S111, the UE 100 performs the random access procedure. Firstly, in step S107, the UE 100 transmits the random access signal including a small-amount-data transmission flag that is information indicating that the small amount of data is transmitted, to the cell. The eNB 200 receives the random access signal including the small-amount-data transmission flag.

In step S108, the eNB 200 confirms whether or not the C-RNTI is held. When the C-RNTI is not held, the eNB 200 recognizes that this random access procedure is a normal random access procedure.

When the C-RNTI is held (step S108: YES), in step S109, the eNB 200 transmits the random access response that is a response to the random access signal, to the UE 100. The random access response may include information indicating whether or not to permit transmission of the small amount of data. The UE 100 receives the random access response.

In step S110, the UE 100 transmits the small amount of data to the eNB 200, in response to the reception of the random access response. In the first embodiment, the small amount of data is a control signal indicating a communication state of the WLAN communication. The UE 100 transmits, together with the small amount of data, the C-RNTI to the eNB 200. The eNB 200 receives the small amount of data and the C-RNTI.

In step S111, the eNB 200 transmits a small-amount-data transmission response to the UE 100, in response to the reception of the small amount of data. The small-amount-data transmission response includes ACK/NACK that is information indicating whether or not it is successful to receive the small amount of data.

Once receiving the small-amount-data transmission response including the ACK indicting that it is successful to receive the small amount of data, from the eNB 200, the UE 100 ends the random access procedure without transitioning to the connected state.

Second Embodiment

In a second embodiment, description proceeds with a particular focus on a difference from the first embodiment. A system configuration and an operation environment of the second embodiment are in much the same way as in the first embodiment.

(1) Communication Control Method According to Second Embodiment

A communication control method according to the second embodiment includes steps of: receiving, by the UE 100, a parameter identifier indicating a parameter that should be applied to the random access signal to be transmitted to the cell, from the cell; and holding, by the UE 100 and the cell, the parameter identifier, prior to the step of performing the random access procedure. In the second embodiment, the parameter that should be applied to the random access signal is a random access resource. The random access resource is defined by ra-PreambleIndex and ra-PRACH-MaskIndex.

The step of performing the random access procedure includes a step of transmitting, by the UE 100, the random access signal to which the parameter indicated by the parameter identifier is applied and which includes the small amount of data, to the cell.

Thus, in the second embodiment, the small amount of data is included in the random access signal. Therefore, as compared to the first embodiment, the small amount of data is transmitted at an initial stage in the random access procedure and it is possible to end the random access procedure early. Consequently, it is possible to further reduce the load of the network and the battery consumption of the UE 100.

(2) Operation Sequence According to Second Embodiment

FIG. 9 is an operation sequence chart according to the second embodiment.

As shown in FIG. 9, in step S201, the UE 100 is in a state of establishing an RRC connection with the eNB 200 (connected state).

In step S202, the eNB 200 transmits a connection release request for requesting a release of the RRC connection, to the UE 100. In the second embodiment, the connection release request includes the C-RNTI holding flag, and RA-RNTI (Random Access-Radio Network Temporary Identifier) that is an identifier indicating the random access resource. The UE 100 receives the connection release request including the C-RNTI holding flag and the RA-RNTI.

In step S203-1, the UE 100 confirms whether or not the C-RNTI holding flag included in the connection release request is "true" indicating that the holding of the C-RNTI is requested. When the C-RNTI holding flag is "true" (step S203-1: YES), in step S204-1, the UE 100 holds the C-RNTI and the RA-RNTI assigned from the eNB 200.

In step S203-2, the eNB 200 confirms whether or not the C-RNTI holding flag included in the connection release request is "true" indicating that the holding of the C-RNTI is requested. When the C-RNTI holding flag is "true" (step S203-2: YES), in step S204-2, the eNB 200 holds the C-RNTI and the RA-RNTI assigned to the UE 100 in association with each other.

In step S205-1, the UE 100 transitioned to the idle state in response to the connection release request exchanges the traffic with the AP 300. This reduces (that is, offloads) the traffic load of the eNB 200.

In step S205-2, the eNB 200 continues to monitor the situation of the UE 100 in preparation for a situation where the UE 100 is connected again with the cell of the eNB 200.

In step S206, the UE 100 confirms whether or not the C-RNTI and the RA-RNTI are held. When the C-RNTI or the RA-RNTI is held and when there arises a need of transmitting the small amount of data to the eNB 200, the UE 100 determines to start the random access procedure for transmitting the small amount of data. Examples of when there arises a need of transmitting the small amount of data include when a predetermined event (worsening of a communication state with the AP 300, for example) occurs or when a periodical timer expires.

From steps S207 to S212, the UE 100 performs the random access procedure. Firstly, in step S207, the UE 100 transmits the random access signal to which the random access resource indicated by the held RA-RNTI is applied, to the eNB 200. In the second embodiment, the random access signal includes the small amount of data. The small amount of data is a control signal indicating a communication state of the WLAN communication. The eNB 200 receives the random access signal including the small amount of data.

In step S208, the eNB 200 confirms whether or not the C-RNTI is held. When the C-RNTI is not held, the eNB 200 recognizes that this random access procedure is a normal random access procedure.

When the C-RNTI is held (step S208: YES), in step S209, the eNB 200 confirms whether or not, in the received random access signal, the random access resource corresponding to the RA-RNTI assigned in the cell of the eNB 200 is applied. When "No" is found in step S209, in step S210, the eNB 200 recognizes that this random access procedure is a normal random access procedure.

On the other hand, when "Yes" is found in step S209, in step S211, the C-RNTI associated with the RA-RNTI corresponding to the received random access signal is designated. That is, the UE 100 from which the random access signal is originated is recognized. As a result, the eNB 200 is capable of grasping the UE from which the small amount of data included in the random access signal is transmitted.

In step S212, the eNB 200 transmits a small-amount-data transmission response to the UE 100, in response to the reception of the small amount of data. The small-amount-data transmission response includes ACK/NACK that is information indicating whether or not it is successful to receive the small amount of data.

Once receiving the small-amount-data transmission response including the ACK indicting that it is successful to receive the small amount of data, from the eNB 200, the UE 100 ends the random access procedure without transitioning to the connected state.

OTHER EMBODIMENTS

In the first embodiment and the second embodiment described above, the eNB 200 may include a transmission trigger for the small amount of data and/or a data category to be transmitted as the small amount of data, into the connection release request for requesting a release of the RRC connection. As a result, it is possible to more flexibly transmit the small amount of data.

In the first embodiment and the second embodiment described above, it is assumed that after switching the connection from the eNB 200 to the AP 300, the UE 100 is connected again with the eNB 200. However, when the AP 300 is installed at the end of the coverage area of the eNB 200, for example, the UE 100 may be connected with another eNB 200 after switching the connection from the eNB 200 to the AP 300. Thus, when being connected with another eNB 200 (or performing a cell reselection), the UE 100 in the idle state connected with the AP 300 may transmit, as the small amount of data, a control signal indicating to that effect, to the eNB 200. In that case, the UE 100 and the eNB 200 may discard the held C-RNTI (and the RA-RNTI). It is noted that the UE 100 and the eNB 200 may discard the held C-RNTI (and the RA-RNTI) after a constant time period passes since a start of the offload to the AP 300.

In the first embodiment and the second embodiment described above, a case where the UE 100 in the idle state performs the WLAN communication with the AP 300 is described. However, the UE 100 in the idle state may not need to perform the WLAN communication with the AP 300. For example, the UE 100 in the idle state may perform D2D (Device to Device) communication with another UE 100. The D2D communication is a communication mode in which a plurality of neighboring UEs 100 perform direct device-to-device communication without passing through a core network. When the UE 100 that performs D2D communication in the idle state transmits to the cell of the eNB 200 the control signal (small amount of data) indicating a communication state of the D2D communication, the eNB 200 is capable of grasping the communication state of the D2D communication.

In the above-described embodiments, as one example of the cellular communication system, the LTE system is described; however, the present invention is not limited to the LTE system, and the present invention may be applied to systems other than the LTE system.

INDUSTRIAL APPLICABILITY

According to the present invention, it is possible to enable efficient transmission of a small amount of data to a cell from a user terminal in an idle state.

The invention claimed is:

1. A communication control method performed at a base station, comprising steps of:
   transmitting, to a user terminal, a connection release request for requesting a release of an RRC connection, wherein the connection release request includes information indicating a request of holding an identifier assigned by the base station, and the information causes the user terminal in an idle state to hold the identifier; and
   performing a random access procedure with the user terminal in the idle state, wherein
   the step of performing the random access procedure includes the steps of:
      receiving a random access signal from the user terminal;
      transmitting a random access response that is a response to the random access signal, to the user terminal; and
      receiving a control signal together with the identifier from the user terminal after transmitting the random access response, while the user terminal is in the idle state.

2. A base station, comprising:
   a controller configured to
      transmit, to a user terminal, a connection release request for requesting a release of an RRC connection, wherein the connection release request includes information indicating a request of holding an identifier assigned by the base station, and the information causes the user terminal in an idle state to hold the identifier; and
      perform a random access procedure with the user terminal in the idle state, wherein
   in the random access procedure, the controller is configured to
      receive a random access signal from the user terminal;
      transmit a random access response that is a response to the random access signal, to the user terminal; and
      receive a control signal together with the identifier from the user terminal after transmitting the random access response, while the user terminal is in the idle state.

* * * * *